(12) United States Patent
Yasumura et al.

(10) Patent No.: US 11,561,345 B2
(45) Date of Patent: Jan. 24, 2023

(54) APERTURES FOR REDUCED DYNAMIC CROSSTALK AND STRAY LIGHT CONTROL

(71) Applicant: Google LLC, Mountain View, CA (US)

(72) Inventors: Kevin Yasumura, Lafayette, CA (US); Jill Berger, Saratoga, CA (US)

(73) Assignee: Google LLC, Mountain View, CA (US)

( * ) Notice: Subject to any disclaimer, the term of this patent is extended or adjusted under 35 U.S.C. 154(b) by 47 days.

(21) Appl. No.: 17/034,826

(22) Filed: Sep. 28, 2020

(65) Prior Publication Data

US 2021/0255392 A1 Aug. 19, 2021

Related U.S. Application Data

(60) Provisional application No. 62/976,732, filed on Feb. 14, 2020.

(51) Int. Cl.
*G02B 6/28* (2006.01)
*G02B 6/32* (2006.01)
(Continued)

(52) U.S. Cl.
CPC ............ *G02B 6/2848* (2013.01); *G02B 6/32* (2013.01); *G02B 27/30* (2013.01); *G02B 6/3518* (2013.01)

(58) Field of Classification Search
CPC ...... G02B 6/2848; G02B 6/3518; G02B 6/32; G02B 27/30
See application file for complete search history.

(56) References Cited

U.S. PATENT DOCUMENTS 6,124,974 A * 9/2000 Burger ................. H04N 5/3415
359/621
9,726,824 B1 * 8/2017 Berger ..................... G02B 6/32
(Continued)

FOREIGN PATENT DOCUMENTS

CN 105307559 A * 2/2016 ........... A61B 5/1459
CN 106932915 A 7/2017
(Continued)

OTHER PUBLICATIONS

Extended European Search Report for European Patent Application No. 20211044.1 dated May 12, 2021. 10 pages.
(Continued)

*Primary Examiner* — Daniel Petkovsek
(74) *Attorney, Agent, or Firm* — Lerner, David, Littenberg, Krumholz & Mentlik, LLP (57) ABSTRACT

The present disclosure provides systems and methods for preventing or minimizing optical crosstalk in an optical circuit switch ("OCS"). The OCS may include a collimator lens assembly. The collimator lens assembly may include a lens array defined by a plurality of ports. Each port may include a lenslet and a spacer paired with each lenslet. Crosstalk may occur when light from other ports enter the target port's optical fiber. The collimator lens assembly may include an insert positioned relative to the lenslet. The insert may define an aperture that allows light from the target port to pass through. The insert may prevent a portion of light from adjacent ports from passing through the aperture. The insert may be located between the lenslet and spacer, on the curved surface of the lenslet, or on a plate located at a distance from the front of the lenslet.

22 Claims, 12 Drawing Sheets

(51) Int. Cl.
*G02B 27/30* (2006.01)
*G02B 6/35* (2006.01)

(56) References Cited

U.S. PATENT DOCUMENTS

| | | | |
|---|---|---|---|
| 10,292,620 B1* | 5/2019 | Choi | A61B 1/00149 |
| 2008/0136956 A1* | 6/2008 | Morris | H01L 27/14685 |
| | | | 348/340 |
| 2008/0144174 A1 | 6/2008 | Lucente et al. | |
| 2011/0216215 A1* | 9/2011 | Maruyama | H04N 5/2258 |
| | | | 348/222.1 |
| 2018/0329065 A1* | 11/2018 | Pacala | H01L 31/02027 |
| 2018/0335615 A1 | 11/2018 | Tsur et al. | |
| 2019/0011567 A1* | 1/2019 | Pacala | G01S 17/10 |

FOREIGN PATENT DOCUMENTS

| | | | | |
|---|---|---|---|---|
| CN | 210038236 U | | 2/2020 | |
| JP | H04234699 A | | 8/1992 | |
| JP | H10210213 A | * | 8/1998 | H04N 1/028 |
| WO | WO-9938046 A1 | * | 7/1999 | G02B 27/4211 |
| WO | 2018190254 A1 | | 10/2018 | |

OTHER PUBLICATIONS

Office Action for Chinese Patent Application No. 202011229321.0 dated May 7, 2022. 8 pages.
Office Action for Chinese Patent Application No. 202011229321.0 dated Nov. 9, 2022. 7 pages.

* cited by examiner

APERTURES FOR REDUCED DYNAMIC CROSSTALK AND STRAY LIGHT CONTROL

CROSS-REFERENCE TO RELATED APPLICATIONS

The present application claims the benefit of the filing date of U.S. Provisional Patent Application No. 62/976,732 filed Feb. 14, 2020, the disclosure of which is hereby incorporated herein by reference.

BACKGROUND

Optical communications use modulated light beams to convey information through optical fibers, free space, or waveguides. A beam of light can be modulated either directly by modulating current to a light source, or externally by using an optical modulator to modulate a continuous-wave light beam produced by the light source. External modulation has advantages in that it can handle higher power and frequencies; however, the required components can be larger, more complex, and more expensive.

An optical circuit switch (OCS) is an all-optical, 3D switching matrix that can direct light from any input fiber N to any output fiber M by changing the angles of the mirrors in two 2D micro-electromechanical system (MEMS) mirror arrays. The switch is designed for low insertion loss over a broad wavelength range, so each fiber can carry many wavelengths. The OCS is also designed for fast, reliable switching by the MEMS mirror arrays. Optical performance requirements include insertion loss, return loss, dynamic optical crosstalk, and static optical crosstalk.

SUMMARY

One aspect of the disclosure provides for a collimator lens assembly. The system may include a lens array defined by a plurality of ports, including a first port and one or more neighboring ports. Each port may have a lenslet. The assembly may include a spacer paired with each lenslet in the lens array and an insert positioned in relation to the lenslet and defining an aperture such that light from the first port passes through the aperture and at least a portion of light from the at least one neighboring port is blocked by the insert. The lenslet, the spacer, and the aperture are each aligned along a longitudinal axis. The insert may be coupled to at least one of (1) a front surface of the spacer, the front surface being adjacent to a back surface of the lens array, (2) the back surface of the lens array, or (3) a front surface of the lens array, the front surface being opposite the back surface.

When the insert is coupled to the front surface of the lens array, the insert may be made of low reflectance chrome. The insert may be located at a distance from a front surface of the lens array. The assembly may further include a plate located at the distance from the front surface of the lens array, wherein when the insert is located at a distance from the front surface of the lens array, the insert is coupled to the plate. The lens array may be molded into a single piece of glass. When light from the first port passes through the aperture, the light may be a collimated free-space beam. Each lenslet of the lens array may have the same radii of curvature.

Another aspect of the disclosure provides for a system comprising at least one optical fiber and at least one collimator lens assembly coupled to the at least one optical fiber. The at least one collimator lens assembly may include a lens array defined by a plurality of ports, including a first port and one or more neighboring ports, each port having a lenslet, a spacer paired with each lenslet in the lens array, and an insert positioned in relation to the lenslet and defining an aperture such that light from the first port passes through the aperture and at least a portion of light from the at least one neighboring port is blocked by the insert.

Yet another aspect of the disclosure provides for a method of transmitting information through a fiber optic data port. The method includes positioning an insert within a fiber collimator including a plurality of optical data ports, each optical data port associated with a spacer and a lens for transmitting optical data, wherein the insert includes at least one aperture and is positioned in relation to the lens of a first port of the plurality of optical data ports, receiving first optically transmitted data through the first port of the plurality of optical data ports in the fiber collimator, receiving second optically transmitted data through a second port of the plurality of optical data ports in the fiber collimator, the second port neighboring the first port, and blocking, by the insert, at least a portion of the second optically transmitted data from the second port while allowing the first optically transmitted data from the first port to pass through the at least one aperture of the insert.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

This disclosure generally relates to preventing optical crosstalk between ports of a fiber optic collimator. The fiber optic collimator may include a lens array defining a plurality of ports for each incoming optical fiber. Each port of the lens array may include a lenslet that may collimate light from the port of interest into a free space beam. To prevent optical crosstalk between neighboring ports, the collimator lens assembly may include an insert, such as an aperture plate, defining at least one aperture. Crosstalk occurs when light from a neighboring port is directed into the connected port, or the port of interest. The connected port may, for example, carry internet traffic or data.

The insert may be a continuous sheet defining a plurality of apertures that align axially with each lenslet. When the insert is a continuous sheet, the continuous sheet may be positioned with respect to the lens array in the collimator lens assembly. For example, the continuous sheet may be positioned between the plurality of lenslets and spacers, the continuous sheet may be positioned relative to the front edge of the plurality of lenslets, or the continuous sheet may be located at a position spaced at a distance from the front edge of the lens array or plurality of lenslets. In some examples, there may be a plurality of individual inserts positioned in relation to each of the lenslets in the lens array. When the inserts are a plurality of individual inserts, each individual insert may be coupled to a part of each collimator lens assembly, such as the front surface of the spacer, the back surface of the lenslet, the front surface of the lenslet, or on a plate placed at a distance from the lenslet. The aperture may be sized and shaped to allow light from the port of interest to pass through while preventing light from neighboring ports from passing through. Thus, the insert may prevent or substantially reduce optical crosstalk.

Figure 1:
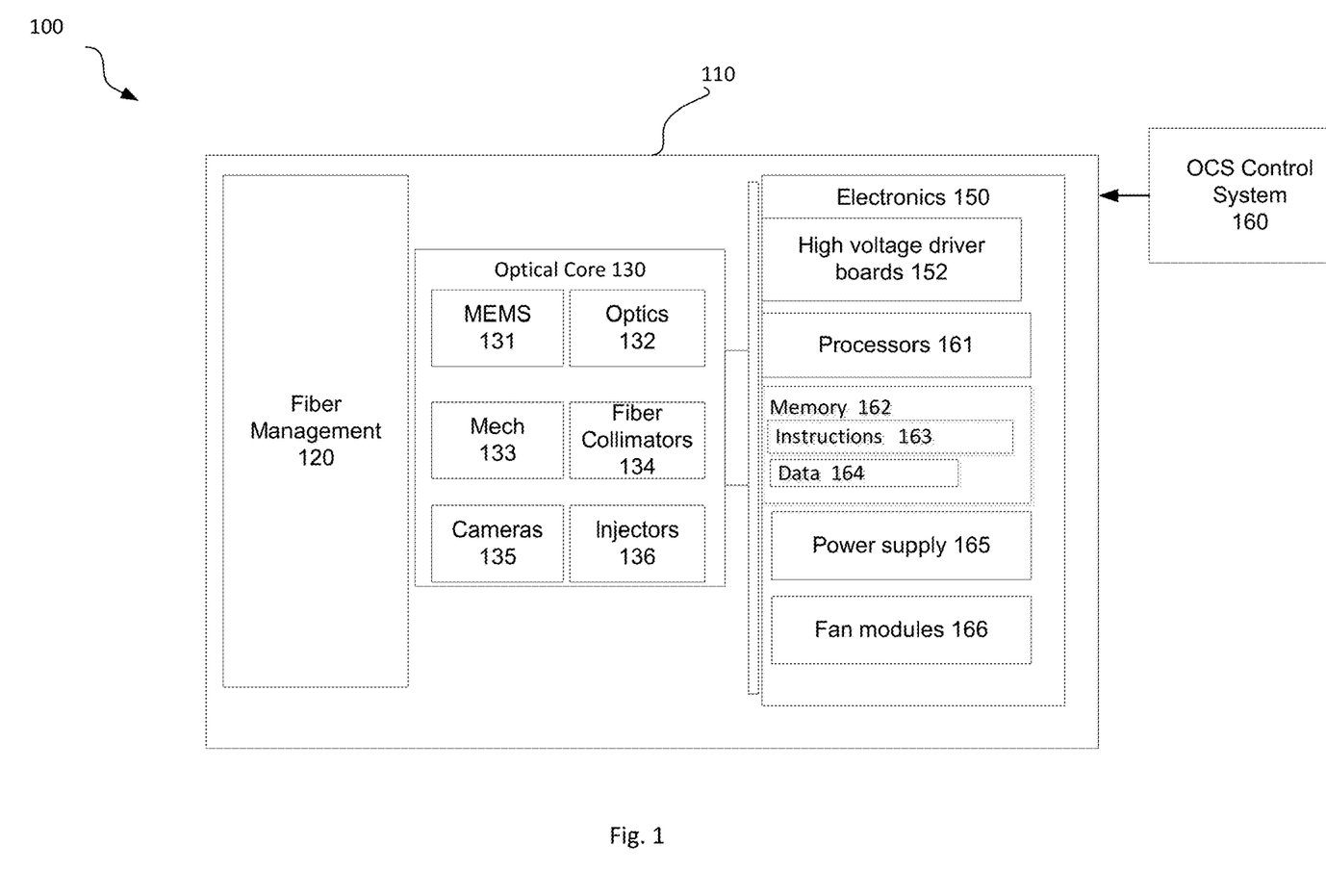
FIG. 1 is a block diagram illustrating an OCS according to aspects of the disclosure.

FIG. 1 illustrates an example OCS 100. The OCS 100 includes a structure such as chassis 110 supporting a number of components. In a front of the OCS chassis 110 are optical fiber connections, such as fiber management block 120. The OCS 100 may further include, such as in a middle, an optical core 130. The optical core houses MEMS 131, fiber collimators 134, optics 132, cameras 135, and injectors 136 and other mechanisms 133. A rear of the OCS 100 includes electronics 150, such as high voltage driver boards 152 for the MEMS, one or more processors 161, such as a CPU board, one or more memories 162 storing executable software, and power supplies 165 and fan modules 166. The chassis 110 interfaces with OCS control system 160. While a number of components are shown, it should be understood that such components are merely non-limiting examples, and that other components may additionally or alternatively be included.

There may be any number of input fibers and output fibers connected to the front of the OCS chassis 110. Inside the chassis 110, these fiber fanouts are spliced to the fiber collimators 134.

The fiber collimators 134 are lensed fiber arrays. Just as one example, the fiber collimators 134 may include tens or hundreds or more fiber arrays. The fibers are assembled in a hole array that matches a grid pattern, thereby forming a fiber array. The hole array may be made of silicon or other materials. The fiber array is attached to a mounting flange. A lens array is aligned and attached to the fiber array. Fiber and lens position errors are very tightly controlled.

Figure 2:
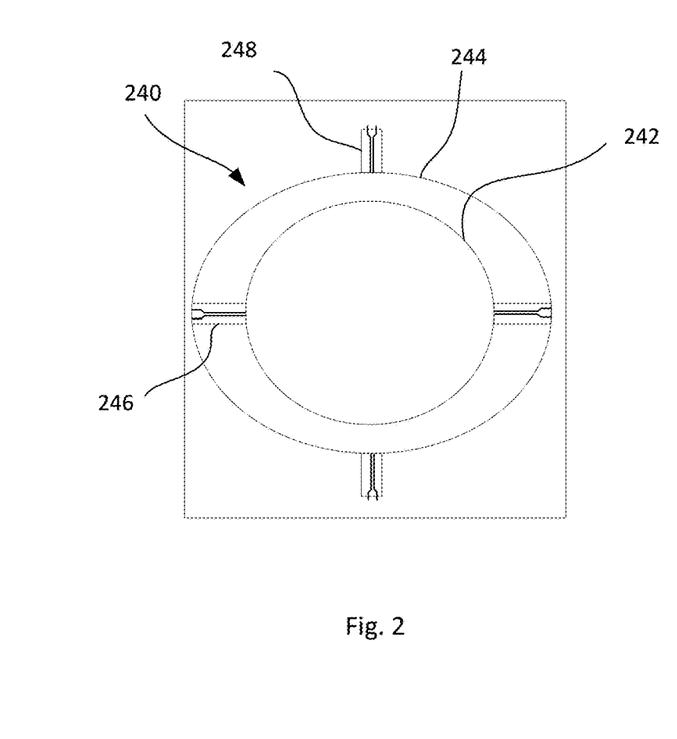
FIG. 2 is an example MEMS mirror according to aspects of the disclosure.

FIG. 2 illustrates an example MEMS mirror 240. The MEMS mirror 240 may vary in size and be highly reflective, for example depending on implementation. By way of example only, the MEMS mirror 240 may be between approximately several hundred microns and several hundred millimeters. The MEMS mirror 240 may be highly reflective. For example, the MEMS mirror 240 may be coated with a highly reflective material, such as gold or other material. The mirror 240 includes an inner portion 242 and an outer portion 244, wherein the inner portion is rotatable about a first axis and the outer portion is rotatable about a second axis. For example, the inner portion may rotate about inner torsion beams 246 actuated by a comb drive actuator. The outer portion may rotate about outer torsion beams 248 actuated by a comb drive actuator. The comb drive actuators may be high voltage, electro-static vertical comb drives which rotate the mirrors about the torsion beams. For example, the rotation may be approximately between +/−1 to 10 degrees when a voltage ranging between tens of volts to hundreds of volts is applied across the electrodes.

Figure 3:
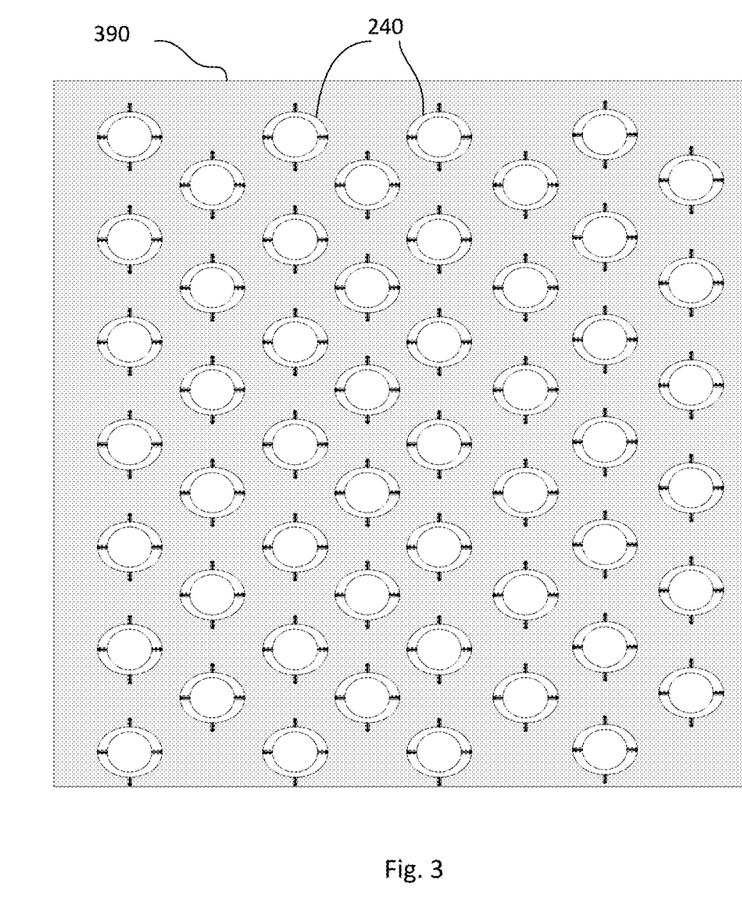
FIG. 3 is an example die including an array of MEMS mirrors according to aspects of the disclosure.

FIG. 3 illustrates an example die including an array of MEMS mirrors 240. Accordingly to some examples, the MEMS die packages include hundreds of MEMS mirror arrays, but in other examples any number of MEMS mirrors may be included. The die may be hermetically sealed inside a package with a window in its lid. Not all of the mirrors may be needed or used at a same time. For example, only the best mirrors and fibers in a MEMS mirror array may be selected to make an optical switch, which may be divided as a number of ports and several spares.

Figure 4:
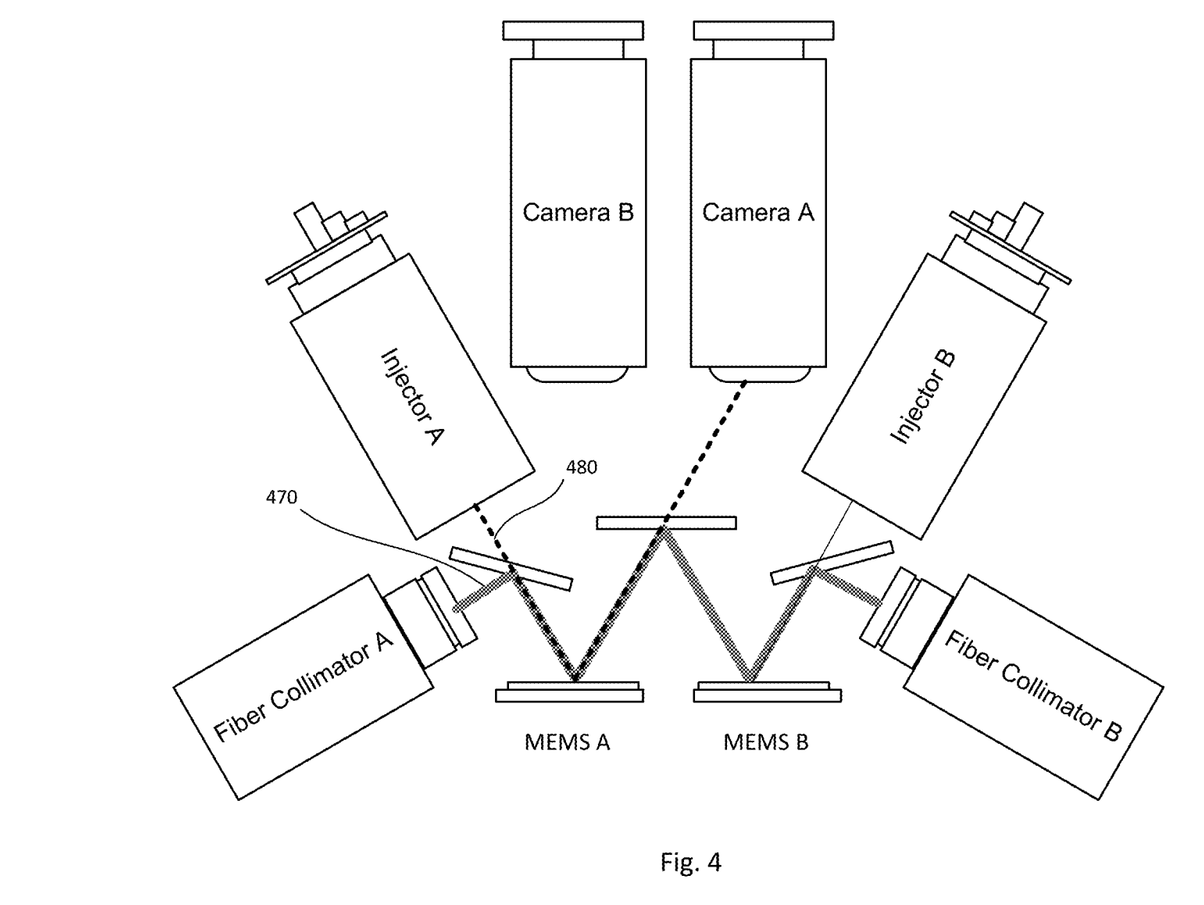
FIG. 4 is an example data path and optical path of the optical core according to aspects of the disclosure.

FIG. 4 provides an example of a data optical path and a monitor optical path included in the optical core. On data path 470, traffic comes in as light input to fiber collimator A. All of the optics in the data path 470 may be designed for very low loss over a variety of wavelengths. The light travels along this path 470, and is reflected from MEMSA, then from MEMSB, then is coupled to output fiber collimator B. MEMS A and MEMS B may be just two MEMS mirrors of a larger array, such as illustrated in FIG. 3 and explained above. By rotating the mirrors in the array, light from any input fiber can be coupled to any output fiber.

Monitor path 480 does not carry data, but provides information to a mirror control system about the positions of the mirrors. This may be done using, for example, an injector to shine small beams on each of the MEMS mirrors, and a camera to view the positions of the beams reflected from the MEMS. There may be a camera/injector pair for each MEMS.

Figure 5:
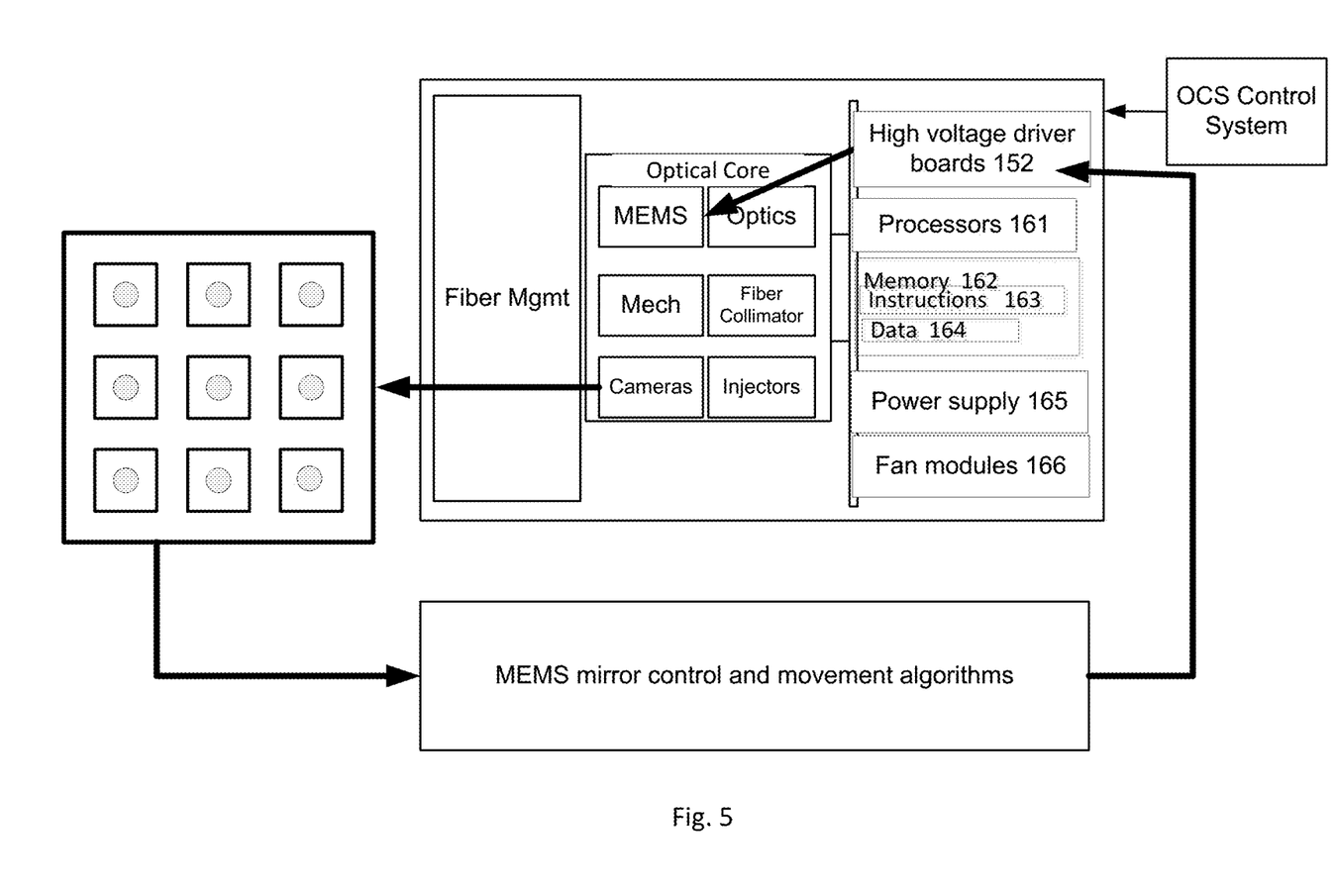
FIG. 5 is an example mirror control loop according to aspects of the disclosure.

FIG. 5 illustrates an example mirror control loop. The OCS control system 160 tells the OCS what configuration it should be in. The mirror control loop handles the MEMS mirror control and movement algorithms based on the monitor path data, and then tells the high voltage drivers to move the mirrors.

Figure 6:
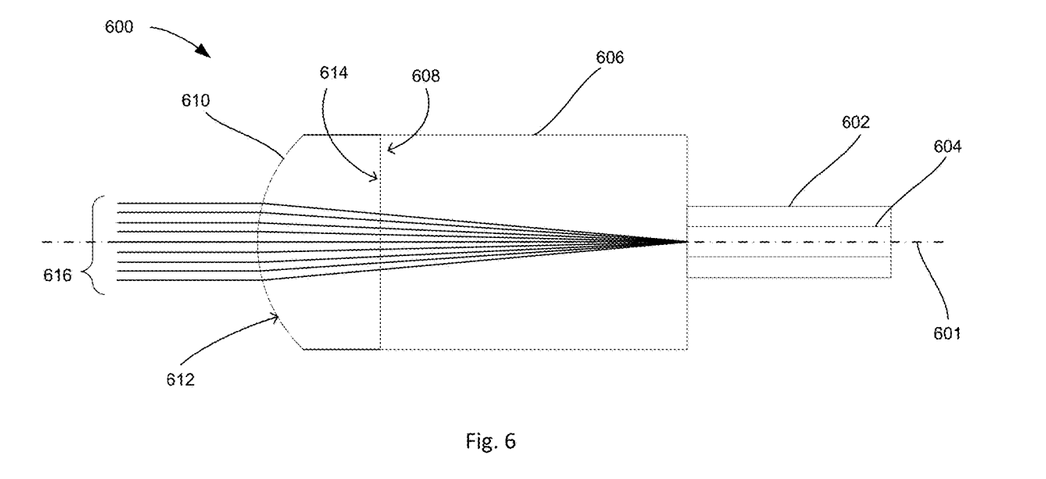
FIG. 6 is an example collimator lens assembly according to aspects of the disclosure.

FIG. 6 illustrates an example collimator lens assembly for a single lenslet of a lens array. The collimator lens assembly 600 may include a spacer 606 and lenslet 610. The spacer 606 may be made of a thin piece of glass that is bonded to lenslet 610. The spacer may be made of a glass that has the same index of refraction as the fiber core. According to some examples, the front edge 608 of spacer 606 may be bonded to a back edge 614 of lenslet 610. In some examples, the spacer 606 may not be bonded to lenslet 610. In such an example, spacer 606 may abut, be positioned adjacent to, or be axially aligned with lenslet 610. Lenslet 610 may have a front edge 612, defined by a curved surface and a back edge 614 opposite the front edge 612. The spacer 606 and lenslet 610 may be axially aligned with fiber 602 and fiber core 604. Fiber 602 and fiber core 604 may be coupled to the spacer 606. For example, the collimator lens assembly 600 may include a longitudinal axis 601 that extends along the length of the spacer 606 and lenslet 610. Fiber 602 and fiber core 604 may align with longitudinal axis 601 at or near where fiber 602 and fiber core 604 are coupled to spacer 606. The longitudinal axis 601 may axially align with the axis of the collimated light beam.

The optical fiber 602 and fiber core 604 may be coupled or attached to the spacer 606 to transmit data through an OCS. The data may be transmitted in the form of light rays 616. In some examples, laser light may be transmitted through the OCS. The light may travel through the spacer 606 and lenslet 610. The light rays 616 may be collimated by lenslet 610 to turn the light rays 615 into a collimated free space beam that can then be used in the OCS. For example, as shown in FIG. 4, light rays 616, once collimated, may be reflected off MEMs mirrors MEMSA and MEMSB such that light rays 616 follow data path 470 from fiber collimator A to fiber collimator B.

Figure 7:
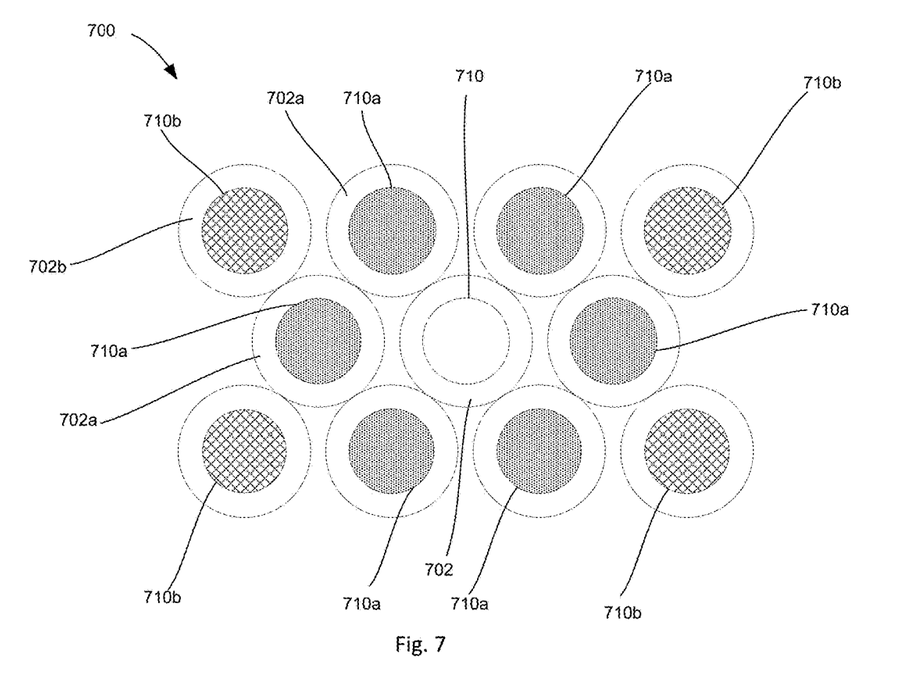
FIG. 7 is an example of a portion of a lens array according to aspects of the disclosure.

Each lenslet may be part of a lens array, as shown in FIG. 7. FIG. 7 illustrates only a portion of lens array 700. Lens array 700 may be molded from a single piece of glass. In other examples, the lenses may be made from different materials and/or by different methods.

Lens array 700 may include a plurality of ports 702, 702a, 702b. The plurality of ports 702, 702a, 702b are shown as having a hexagonal shape, but in other examples may have a square, rectangular, circular, octagonal, or any other shape. The ports 702, 702a, 702b of lens array 700 may correspond to the grid pattern of the MEMs array. For example, lens array 700 may have a pattern corresponding or substantially corresponding to the pattern of MEMS mirror array shown in FIG. 3. According to some examples, the number of ports in lens array 700 may correspond to the number of mirrors in the MEMS mirror array. Thus, as data in the form of light travels through the OCS, light from each port in the lens array 700 may be directed by a MEMS mirror in the MEMS mirror array. According to some examples, two mirrors, one from MEMSA and one from MEMSB, may be required to direct light from any fiber of collimator A to any fiber of collimator B, as shown in FIG. 4.

Each port may include a collimator lens assembly, such that each port may include a lenslet 710, 710a, 710b. Port 702, which includes lenslet 710, may be the port 702 that is of interest. The port of interest may, for example, be the port carrying data intended to pass through the spacer and lenslet for switching. In some examples, the port 702 of interest may be the port undergoing testing for crosstalk. Ports 702a, including lenslets 710a, which are shaded, may be considered the neighboring ports 702a of port 702. Ports 702b, which include lenslets 710b, which are cross-hatched, may be additional ports within the lens array 700. The additional ports 702b may be at a distance far enough away from port 702 that there is no possibility of crosstalk between port 702 and ports 702b.

When transmitting light through port 702, light from neighboring ports 702a, 702b, as well as outside light, is undesired. Light entering port 702 from other ports 702a, 702b, as well as light from any outside source, may be crosstalk. Crosstalk may cause error conditions in the OCS. For example, crosstalk may interfere with the data being transmitted from the port of interest. In some examples, data intended to be routed to a different port may, unintentionally, be included with the data being sent through the port of interest. Optical crosstalk may, for example, cause bit errors in a data stream. In applications that do not involve data communications, crosstalk may also be problematic in that it causes noise.

Figure 8A:
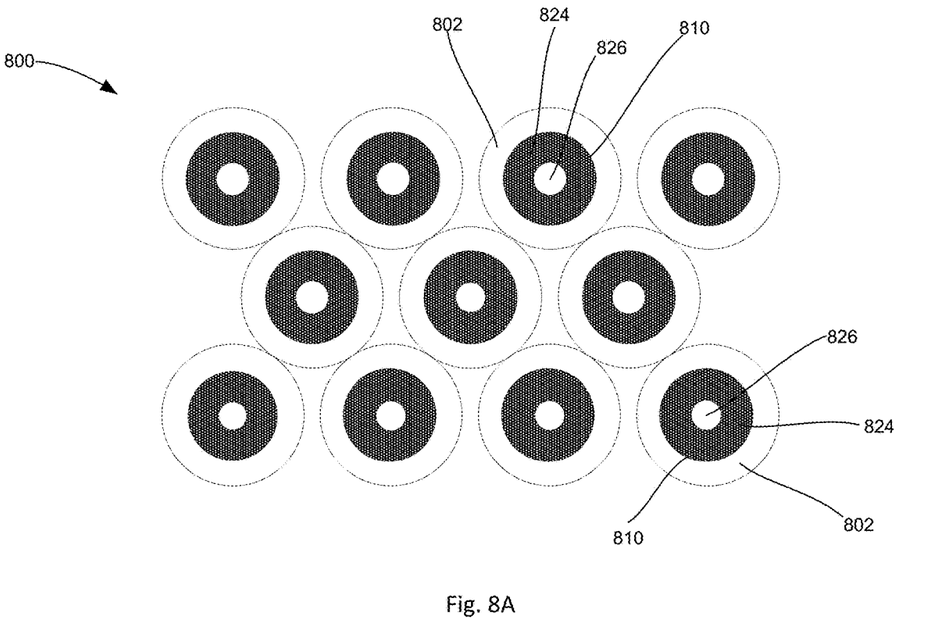
FIG. 8A is an example of a portion of the lens array including individual inserts according to aspects of the disclosure.
Figure 8B:
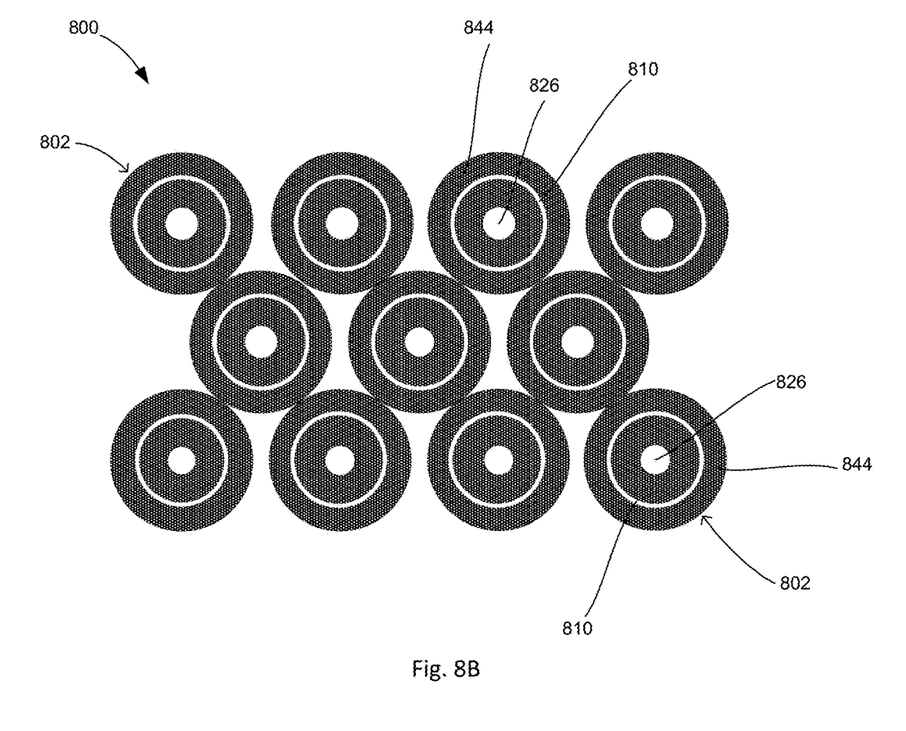
FIG. 8B is an example of a portion of the lens array including a sheet as the insert according to aspects of the disclosure.

FIG. 8A illustrates a lens array, similar to the lens array of FIG. 7. Each port 802 of lens array 800 may include an insert 824. The inserts 824 may be aligned with each lenslet 810. Each insert 824 may define an aperture 826. The apertures 824 may align axially with the spacer and lenslet of the collimator lens assembly. The inserts 824 may be sized and/or shaped to correspond to the size and/or shape of each of the lenslets 810. For example, each lenslet 810 may have a circular cross section having a lenslet diameter, and each insert 824 may have a height and width corresponding to the lenslet diameter of the lenslet 810. For example, where the insert is circular, the insert diameter may correspond to the lenslet diameter. Where the insert is square, rectangular, or other shape, it may be sufficiently sized to block light entering or exiting any portion of the lenslet except for the aperture. According to other examples, such as described below with respect to FIG. 8B, the insert may be a continuous sheet that extends across multiple lenslets. The aperture 826 may have a diameter corresponding to the diameter of the light beam. The diameter of the aperture 826 may be smaller than the diameter of lenslet 810. Thus, when each insert 824 is positioned axially with respect to the spacer and lenslet 810, light from the port of interest may be collimated while light from other sources may be attenuated. The inserts 824 may allow only light coming from the port of interest to be collimated into a free space beam that can then be directed to different fibers using MEMS mirrors. For example, light from neighboring ports or other sources may be substantially blocked from being collimated by lenslet 810 due to inserts 824.

According to some examples, as shown in FIG. 8B, the insert sheet 844 may be a continuous sheet corresponding to the size and shape of lens array 800. The insert sheet 844 may include a grid of apertures 826. The grid of apertures 824 may correspond to each of the lenslets 810 of the lens array 800. For example, the apertures 824 may be axially aligned with each of the spacers and lenslets of the collimator lens assembly.

Figure 8C:
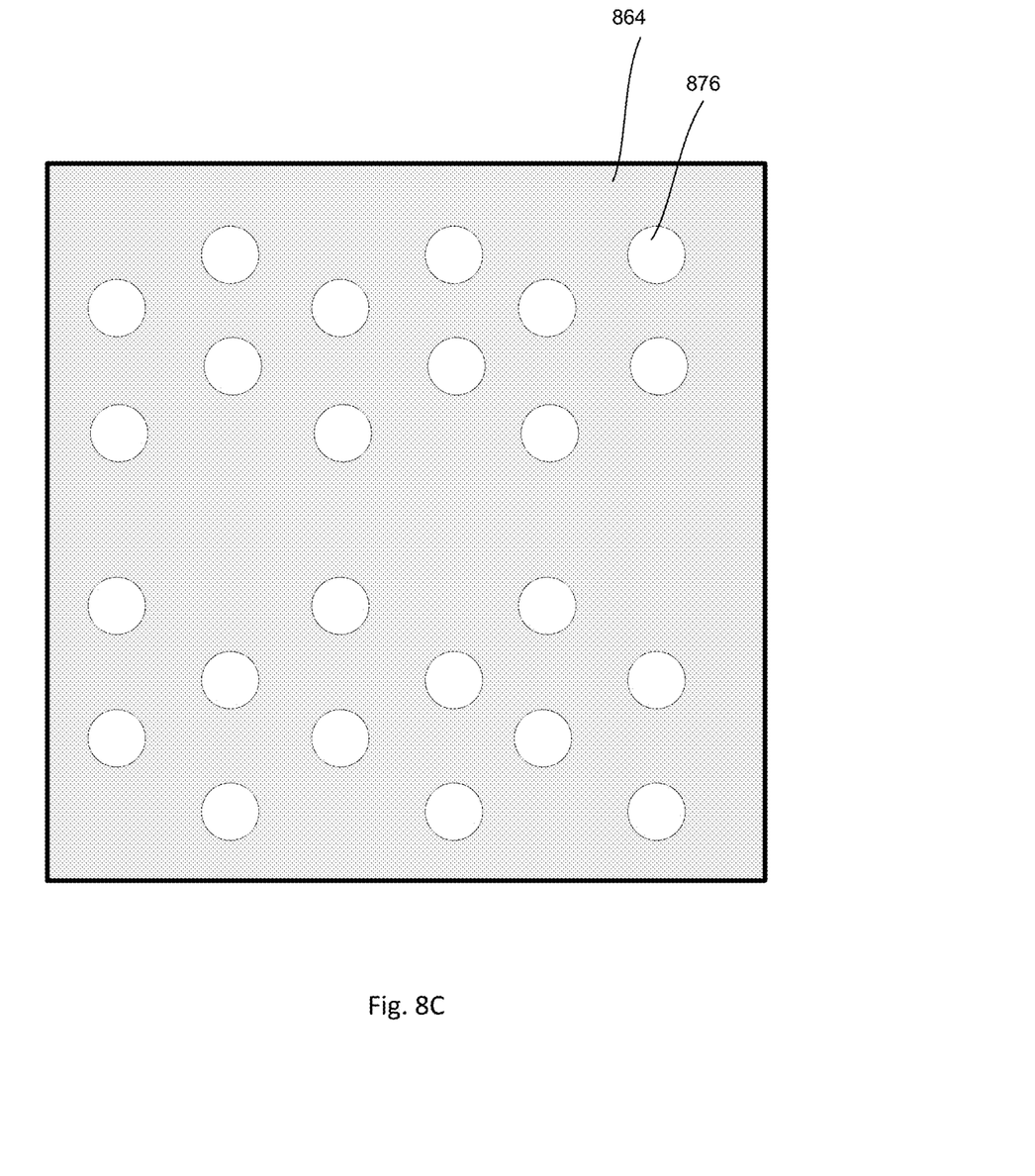
FIG. 8C is a front view of an example insert for a lens array according to aspects of the disclosure.

FIG. 8C illustrates another example aperture sheet 864, including a plurality of apertures 876. For example, the aperture sheet 864 may be a plate positionable relative to a lens array, such that each of the plurality of apertures 876 allows light to pass through while the sheet 864 blocks stray beams.

Figure 9:
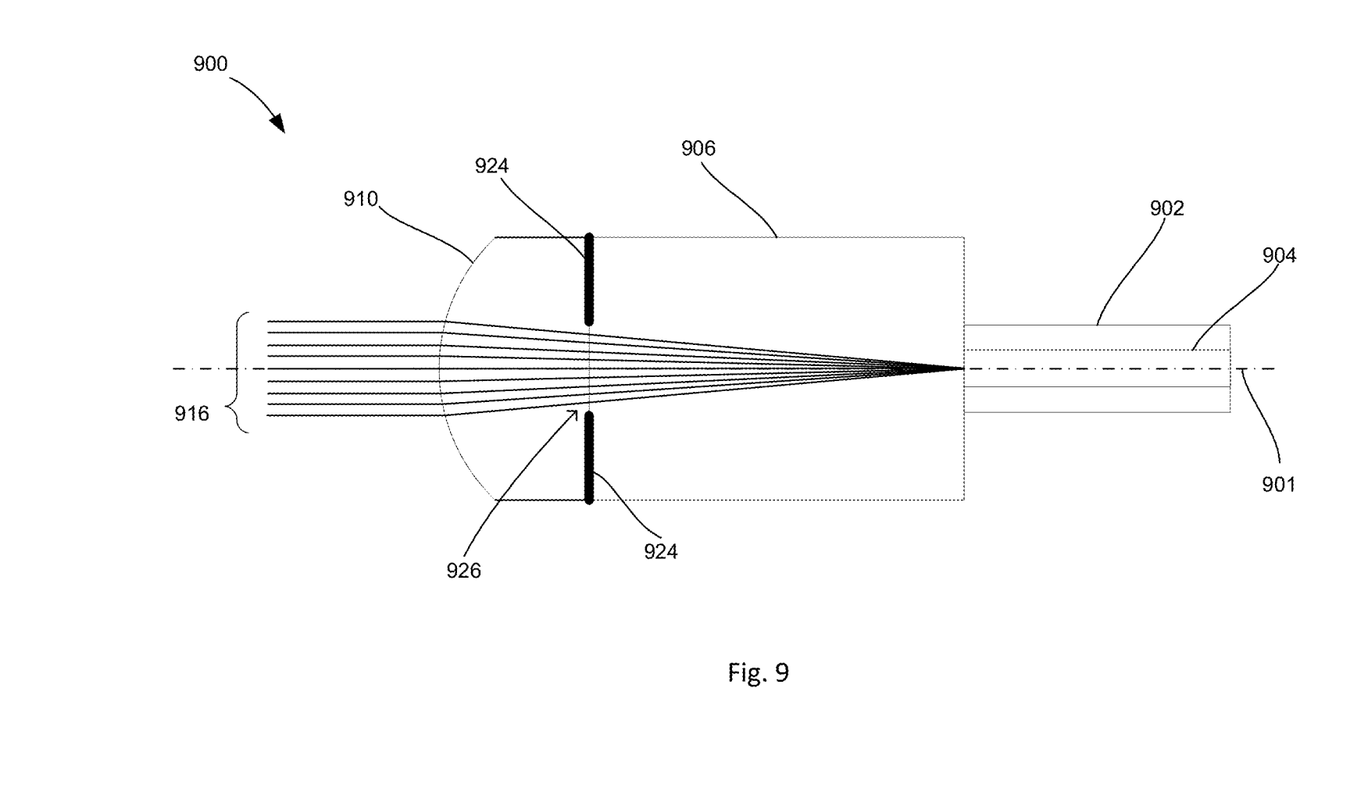
FIG. 9 is an example collimator lens assembly including an insert according to aspects of the disclosure.

FIG. 9 illustrates a cross-sectional view of a collimator lens assembly including an insert. The collimator lens assembly 900 is substantially similar to the collimator lens assembly 600 described with respect to FIG. 6 and, therefore, has substantially corresponding reference numbers. Collimator lens assembly 900 further includes insert 924 positioned between lenslet 910 and spacer 906. For example, insert 924 may be coupled to the back edge 914 of lenslet 910 or the front edge 908 of spacer 906. Thus, insert 924 may be positioned between front edge 908 of spacer 906 and back edge 914 of lenslet 910. In examples where insert 924 is an individual insert, and not a continuous insert sheet, insert 924 may have substantially the same diameter as spacer 906 and lenslet 910 such that insert 924 does not expand past the outer edges of spacer 906 and lenslet 910. In examples where insert 924 is part of a continuous insert sheet, the insert sheet may be sized and shaped to correspond to the size and shape of the entire lens array. Thus, as a continuous insert sheet, insert 924 may extend past the outer edges of spacer 906 and lenslet 910.

Insert 924, similar to insert 824, may define an aperture 926. The aperture 926 may be aligned with the longitudinal axis 901 of spacer 906 and lenslet 910. Aperture 926 may allow desired light 916 to pass through lenslet 910, aperture 926, and spacer 906, and couple into core 904 of fiber 902 Insert 924 may prevent light from other sources, such as neighboring ports and/or fibers, from passing through aperture 926 and, therefore, coupling into core 904 of fiber 902. This may prevent crosstalk between fibers. The aperture 926 may be sized based on how much light should be allowed to pass through and/or how much light should be prevented from passing through the insert 924. For example, the aperture 926 of insert 924 may substantially correspond to the size of the converging light beam at the location of insert 924.

Figure 10A:
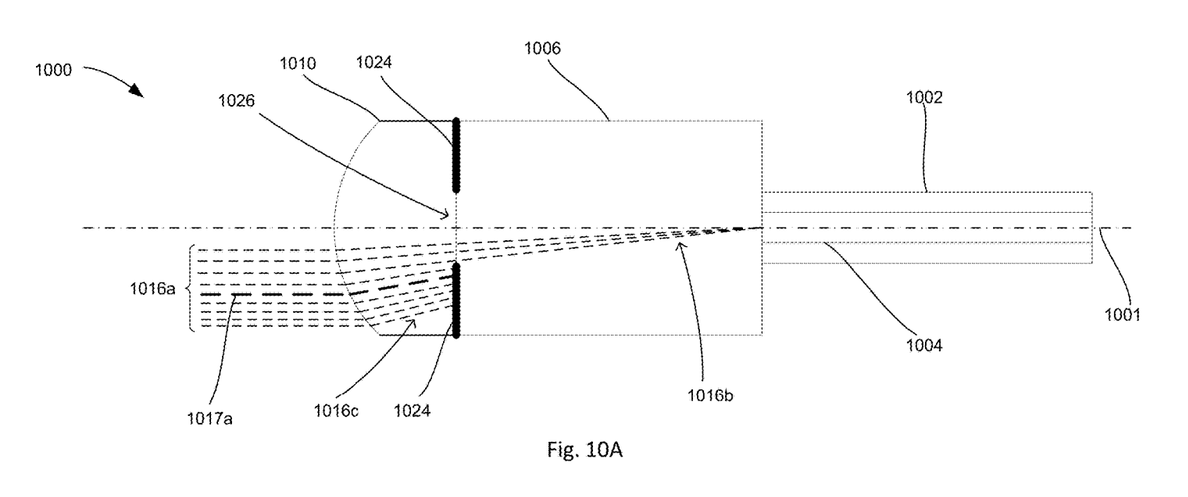
FIG. 10A is an example of light from another source traveling through the collimator lens assembly according to aspects of the disclosure.

FIG. 10A illustrates an example of light coming from another source being blocked by the insert. The collimator lens assembly 1000 substantially corresponds to the collimator lens assembly 600, 900 and, therefore, has substantially corresponding reference numbers. Light 1016a may be coming from a source other than the OCS connected port of interest. For example, the light may originate from a neighboring port, fiber, or outside source. Light 1016a may travel through lenslet 1010 before reaching insert 1024. A portion of light 1016c may be blocked by the insert 1024. A portion of light 1016b may pass through aperture 1026 and couple into core 1004 of fiber 1002, and would create optical crosstalk.

By preventing at least a portion of light 1016a from passing through aperture 1026, crosstalk between neighboring ports and/or fibers may be limited. Crosstalk may create noise or disturbances in the transmission of data from the OCS connected port of interest. Thus, allowing only a portion of the light 1016a to pass through aperture 1026, data being carried by fiber 1002 may only experience a small amount of crosstalk. The small amount of crosstalk may, in some examples, not interfere with the transmission of data through fiber 1002. If all of light 1016a were allowed to pass through aperture 1026, the data being carried by fiber 1002 may experience a high level of interference. A high level of interference may result in unintentional data, corrupt data, incoherent data, etc. being transmitted through fiber 1002. Therefore, it is desirable to reduce the amount of crosstalk between neighboring ports as much as possible.

Figure 10B:
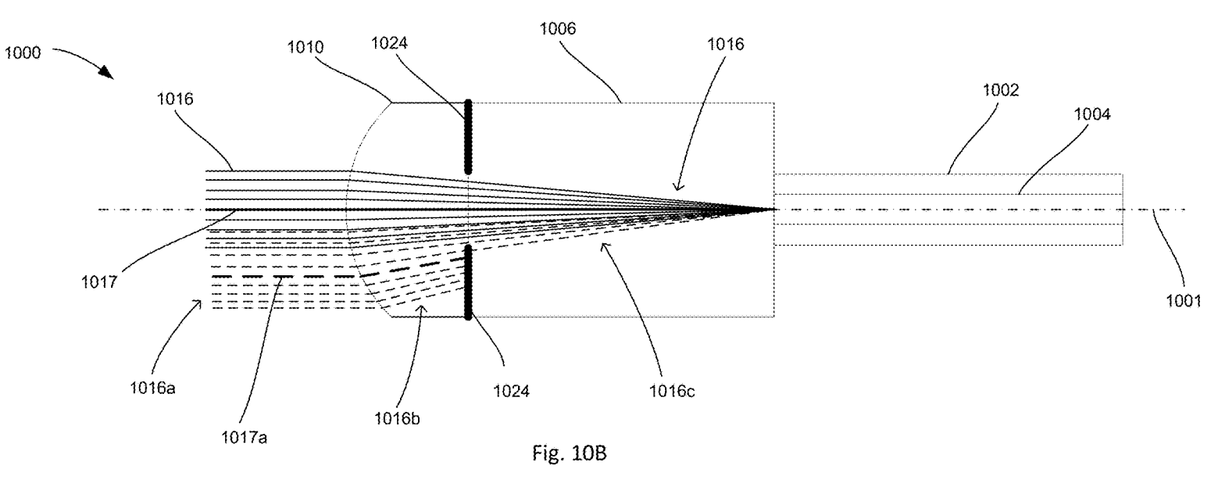
FIG. 10B is an example of light from a fiber and from other sources traveling through the collimator lens assembly according to aspects of the disclosure.

FIG. 10B illustrates an example where crosstalk between the OCS connected port of interest and other light sources is being limited. For example, light 1016 may originate from the connected port of interest. Light 1016 is represented by the solid line light rays traveling through lenslet 1010, aperture 1026, and spacer 1006. Light 1016 may not be blocked by insert 1024 as light 1016 is the light 1016 originating from the connected port of interest. Thus, all or substantially all of light 1016 may pass through aperture 1026 and couple into core 1004 of fiber 1002.

Light from other sources, such as neighboring ports, may be substantially blocked by insert 1024. For example, light 1016a may originate from another source. Light 1016a is represented by the dashed line light rays traveling towards lenslet 1010 and insert 1024. Light 1016a may not be axially aligned with lenslet 1010 and insert 1024. As shown in FIG. 10B, the center ray 1017a of light 1016a may be offset with respect to the center ray 1017 of light 1016. Thus, light 1016a may enter lenslet 1010 at a distance from the longitudinal axis 1001. According to some examples, a portion of light 1016a may be blocked from reaching spacer 1006 by insert 1024 since light 1016a is axially offset. As shown light 1016b may be blocked by insert 1024 and light 1016c may pass through aperture 1026. In some examples, light 1016a may be axially offset such that all light 1016a may be blocked by insert 10124. In this case, light 1016a will not couple into core 1004 of fiber 1002, and optical crosstalk will be avoided.

Figure 11A:
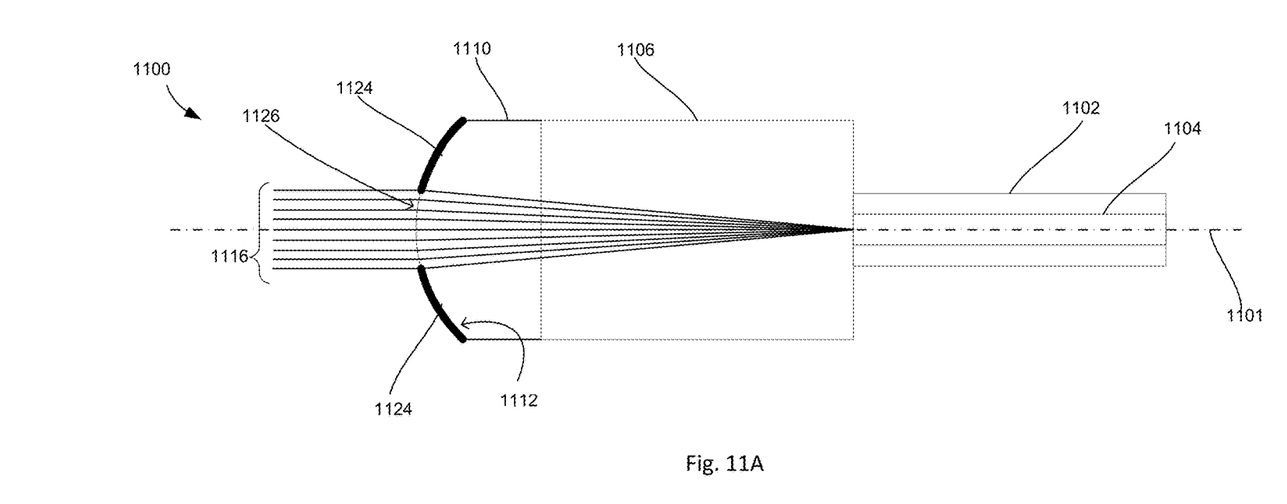
FIGS. 11A and 11B are example collimator lens assemblies including an insert at a different position than in FIG. 9 according to aspects of the disclosure.

FIG. 11 illustrates another example of a collimator lens assembly including an insert, where the insert is positioned adjacent to an outer surface of the lenslet. In this example, insert 1124 is positioned on the front edge 1112 of lenslet 1110. The collimator lens assembly 1100 is substantially similar to the collimator lens assembly 600, 900, 1000 described with respect to FIGS. 6, 9, 10A, and 10B and, therefore, has substantially corresponding reference numbers. As shown, insert 1124 may be coupled to the front edge 1112 of lenslet 1110. The insert 1124 may have a curvature that corresponds or substantially corresponds to the curvature of lenslet 1110. Insert 1124 may define an aperture 1126. According to some examples, insert 1124 may be patterned on a material. The material may be, for example, low reflectance chrome, opaque plastics, or other low reflectance materials. The material may be applied directly to lenslet 1110 or spacer 1006. In such an example, the material may be applied in a way to define aperture 1126. The material may be applied to insert 1124 such that the material defines aperture 1126. The insert 1124 may then be coupled or positioned relative to lenslet 1110.

Figure 11B:
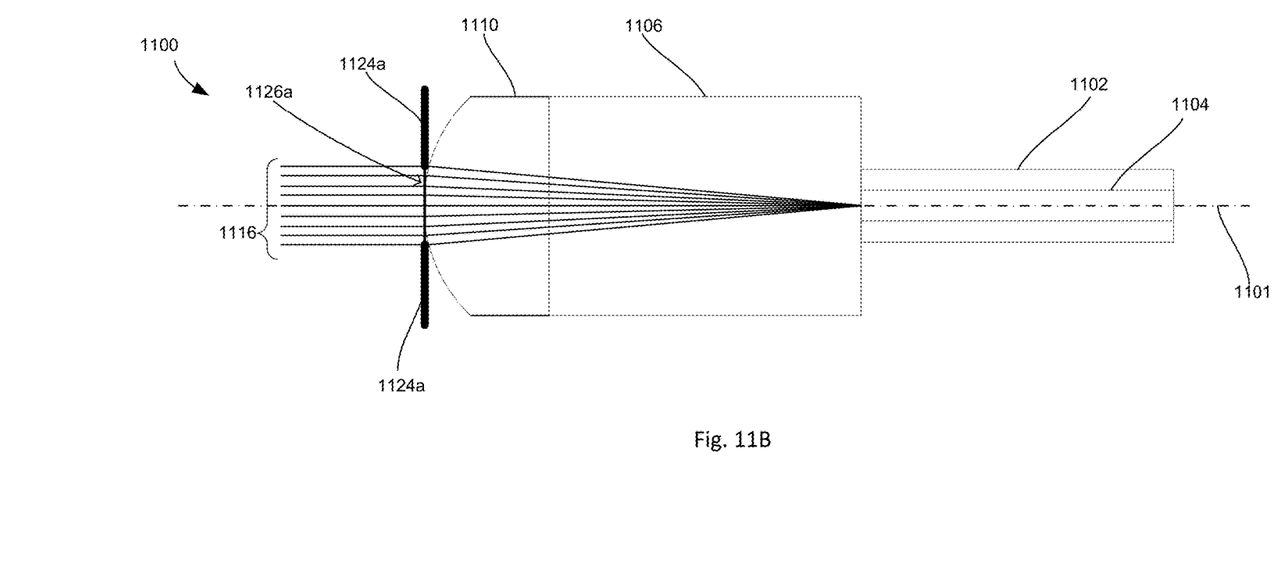

Light 1116 originating from the OCS connected port of interest may travel through lenslet 1110 and spacer 1106. Fiber 1102 and core 1104 may be axially aligned with longitudinal axis 1101 of collimator lens assembly 1100. The center ray 1117 of light 1116 may travel along the longitudinal axis 1101. Aperture 1126 may be sized to allow all or substantially all of the light 1116 originating from the OCS connected port of interest to pass through. Thus, all or substantially all of light 1116 may be coupled into core 1104 of fiber 1102. FIG. 11B illustrates another example where the insert is positioned adjacent to an outer surface of the lenslet. According to this example, rather than having a curvature to match the outer surface of the lenslet, the insert may have a different curvature or no curvature at all. As shown in FIG. 11B, insert 1124a may be tangential to the curvature of front edge 1112 of lenslet 1110. A portion of insert 1124a may be coupled to the curvature of front edge 1112. In some examples, aperture 1126a defined by insert 1124a may be a piece of glass having the same index of refraction as lenslet 1110. Thus, aperture 1126a, defined by insert 1124a, may be coupled to the front edge 1112 of lenslet 1110.

Figure 12:
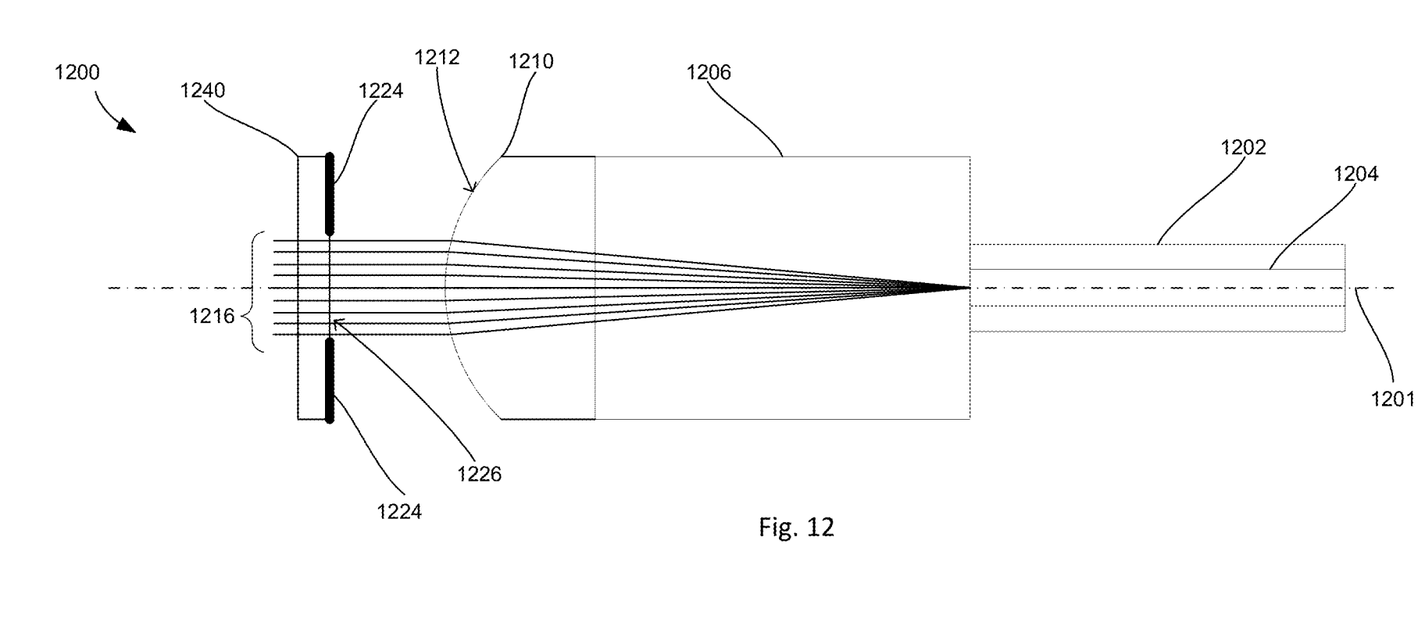
FIG. 12 is an example collimator lens assembly including a plate having an insert according to aspects of the disclosure.

FIG. 12 illustrates a cross-sectional view of a collimator lens assembly including an insert. The collimator lens assembly 1200 is substantially similar to the collimator lens assembly 600, 900, 1000, 1100 described with respect to FIGS. 6, 9, 10A, 10B, and 11 and, therefore, has substantially corresponding reference numbers. In this example, the collimator lens assembly 1200 includes a support plate 1240. Support plate 1240 may be a piece of glass or other material. For example, the support plate may be a fully transparent material, such as clear glass, etc., that allows the light 1216 to pass through. According to other examples, the support plate may include a support plate aperture corresponding in size and shape to the aperture 1226 of the insert 1224. In this regard, the support plate may be any transparent or non-transparent material. The plate may, for example, be made of glass or silicon. The support plate may be patterned with low reflectance chrome. In some examples, the support plate may be made of metal or plastic and have a plurality of holes or bores for the lenslets. The support plate may be attached to the optical core housing or the collimator flange. Plate 1240 may be positioned at a distance from front edge 1212 of lenslet 1210. Light 1216 originating from the OCS connected port of interest may travel through plate 1240, lenslet 1210 and spacer 1206. Lenslet 1210 may couple light 1216 into core 1204 of fiber 1202. Plate 1240 may have an insert 1214 coupled to it. Insert 1224 may define an aperture 1226. While insert 1224 is shown on the surface of plate 1240 closest to lenslet 1210, insert 1224 may be on the opposite surface of plate 1240. Collimated light 1216 may pass through aperture 1226. Insert 1224 may substantially block light from other sources, such as neighboring ports, from passing through aperture 1226. By substantially blocking light from other sources, insert 1224 may prevent crosstalk.

Figure 13:
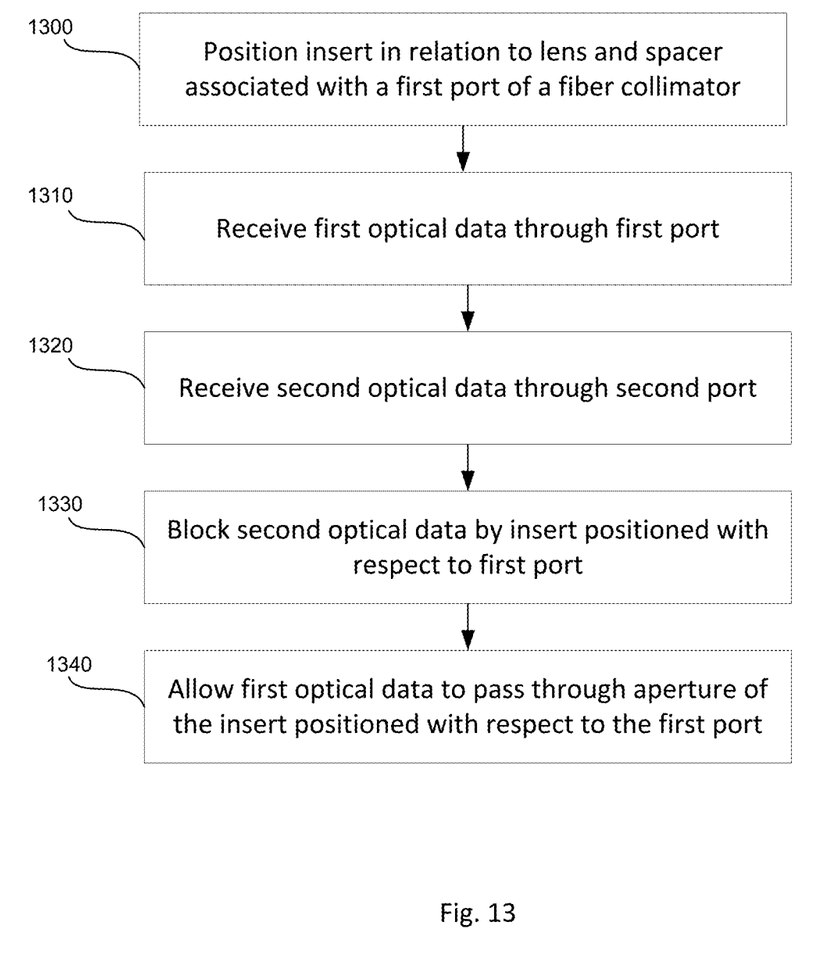
FIG. 13 is a flow diagram illustrating an example method of limiting crosstalk in a collimator according to aspects of the disclosure.

FIG. 13 illustrates an example method for transmitting light through a first fiber collimator in an OCS.

The collimator may be made up of a plurality of fibers, such as tens, hundreds, or thousands of fibers. The fibers may be arranged in an array. For example, the fiber collimator may include a lens array that defines a plurality of ports. The plurality of ports may correspond to the number of fibers. According to one example, there may be approximately 200 ports corresponding to 200 fibers. However, 200 fibers is merely one example and is not meant to be limiting. There may be more or less fibers and, therefore, the number of ports may be more or less. For example, there may be 100, 400, 1000, etc. fibers and a corresponding number of ports. The lens array may substantially correspond to the MEMS mirror array. Each port may include a lenslet. The lenslet may collimate the light input into a collimated light beam.

In block 1300, an insert is positioned in relation to a lens and spacer associated with a first port of a fiber collimator. The insert may be positioned between the lens and the spacer, adjacent to the front edge of the lens, or at a distance from the front edge of the lens. The insert may define an aperture. The insert may allow only certain light to pass through the aperture. For example, the insert may allow only light from the relative port to pass through.

In block 1310, the first port may receive first laser light. The laser light may in some implementations carry optical data, while in others it may not.

In block 1320, a second port may receive second laser light. The second laser light may carry optical data. In block 1330, the second laser light may be blocked by the insert positioned with respect to the first port. According to some examples, all or substantially all of the second laser light may be blocked. Blocking the second laser light may reduce or prevent crosstalk between the first port and the second port.

In block 1340, the first laser light may be allowed to pass through the aperture of the insert positioned with respect to the first port. In this regard, the first laser light may be further routed through the OCS to an output.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A collimator lens assembly, comprising
a lens array defined by a plurality of ports, including a first port and one or more neighboring ports, each port having a lenslet;
a spacer paired with each lenslet in the lens array; and
an insert positioned between the spacer and the lenslet, and defining an aperture such that light from the first port passes through the aperture and at least a portion of light from at least one neighboring port is blocked by the insert.

2. The collimator lens assembly of claim 1, wherein the lenslet, the spacer, and the aperture are each aligned along a longitudinal axis.

3. The collimator lens assembly of claim 1, wherein the insert is coupled to at least one of (1) a front surface of the spacer, the front surface being adjacent to a back surface of the lens array, or (2) the back surface of the lens array.

4. The collimator lens assembly of claim 1, wherein the insert comprises metal.

5. The collimator lens assembly of claim 4, wherein the insert is made of low reflectance chrome.

6. The collimator lens assembly of claim 4, wherein the insert comprises a glass plate with metal deposited on the glass, wherein the insert is patterned to create the aperture.

7. The collimator lens assembly of claim 1, wherein the lens array is molded into a single piece of glass.

8. The collimator lens assembly of claim 1, wherein when light from the first port passes through the aperture, the light is a collimated free-space beam.

9. The collimator lens assembly of claim 1, wherein each lenslet of the lens array has the same radii of curvature.

10. The collimator lens assembly of claim 1, wherein a front end of the spacer abuts a back surface of the insert, and a back surface of the lenslet abuts a front surface of the insert.

11. The collimator lens assembly of claim 10, wherein a back end of the spacer is adapted to be coupled to and transmit data to an optical fiber.

12. A system, comprising:
- at least one optical fiber; and
- at least one collimator lens assembly coupled to the at least one optical fiber, the at least one collimator lens assembly including:
  - a lens array defined by a plurality of ports, including a first port and one or more neighboring ports, each port having a lenslet;
  - a spacer paired with each lenslet in the lens array; and
  - an insert positioned between the spacer and the lenslet and defining an aperture such that light from the first port passes through the aperture and at least a portion of light from the at least one neighboring port is blocked by the insert.

13. The system of claim 12, wherein the insert is coupled to at least one of (1) a front surface of the spacer, the front surface being adjacent to a back surface of the lens array or (2) the back surface of the lens array.

14. The system of claim 12, wherein the insert comprises metal.

15. The system of claim 14, wherein the insert is made of low reflectance chrome.

16. The system of claim 14, wherein the insert comprises a glass plate with metal deposited on the glass, wherein the insert is patterned to create the aperture.

17. The system of claim 12, wherein the lens array is molded into a single piece of glass.

18. The system of claim 12, wherein each lenslet of the lens array has the same radii of curvature.

19. The system of claim 12, wherein a first collimator lens assembly is configured for data input and a second collimator lens assembly is configured for data output.

20. The system of claim 12, wherein the lenslet, spacer, and aperture are aligned along a longitudinal axis.

21. A method of transmitting information through a fiber optic data port, comprising:
- positioning an insert within a fiber collimator including a plurality of optical data ports, each optical data port associated with a spacer and a lens for transmitting optical data, wherein the insert includes at least one aperture and is positioned between the spacer and the lens of a first port of the plurality of optical data ports;
- receiving first optically transmitted data through the first port of the plurality of optical data ports in the fiber collimator;
- receiving second optically transmitted data through a second port of the plurality of optical data ports in the fiber collimator, the second port neighboring the first port; and
- blocking, by the insert, at least a portion of the second optically transmitted data from the second port while allowing the first optically transmitted data from the first port to pass through the at least one aperture of the insert.

22. The method of claim 21, further comprising positioning a second insert between the spacer and a second lens of the second port, the second insert including at least one second aperture for allowing the second optically transmitted data to pass through, while the second insert blocks other optically transmitted data from other ports.

* * * * *